US006990363B2

(12) United States Patent
Ito et al.

(10) Patent No.: US 6,990,363 B2
(45) Date of Patent: Jan. 24, 2006

(54) WIRELESS COMMUNICATION DEVICE WITH AN IMPROVED ANTENNA STRUCTURE

(75) Inventors: Ryo Ito, Tokyo (JP); Takao Ono, Tokyo (JP)

(73) Assignee: NEC Corporation, Tokyo (JP)

( * ) Notice: Subject to any disclaimer, the term of this patent is extended or adjusted under 35 U.S.C. 154(b) by 550 days.

(21) Appl. No.: 10/007,015

(22) Filed: Dec. 4, 2001

(65) Prior Publication Data

US 2002/0068603 A1 Jun. 6, 2002

(30) Foreign Application Priority Data

Dec. 4, 2000 (JP) ............................ 2000-368487

(51) Int. Cl.
*H04M 1/00* (2006.01)

(52) U.S. Cl. .............................. 455/575.5; 455/575.1; 455/550.1; 455/575.7; 455/269; 343/702; 343/700; 343/876

(58) Field of Classification Search .................. 455/89, 455/351, 82, 129, 575.5, 575.1, 575.7, 550.1, 455/269; 343/828, 829, 830, 846, 848, 702, 343/700, 876
See application file for complete search history.

(56) References Cited

U.S. PATENT DOCUMENTS 4,521,913 A * 6/1985 Huber et al. ................ 455/121
4,700,194 A * 10/1987 Ogawa et al. ....... 343/700 MS
5,355,524 A * 10/1994 Higgins, Jr. ................. 455/82
5,367,311 A 11/1994 Egashira et al.
5,757,326 A * 5/1998 Koyama et al. ............ 343/702
6,002,367 A * 12/1999 Engblom et al. .... 343/700 MS
6,049,314 A * 4/2000 Munson et al. ............. 343/846
6,097,339 A * 8/2000 Filipovic et al. ............ 343/702
6,133,883 A * 10/2000 Munson et al. ...... 343/700 MS
6,140,966 A * 10/2000 Pankinaho .......... 343/700 MS
6,147,652 A 11/2000 Sekine
6,326,927 B1 * 12/2001 Johnson et al. ............. 343/702
6,342,855 B1 * 1/2002 Rothe .................. 343/700 MS (Continued)

FOREIGN PATENT DOCUMENTS

EP 0 246 026 A2 11/1987
EP 0 924 795 A1 6/1999
EP 0 694 984 A1 11/2001

(Continued)

OTHER PUBLICATIONS

Iwai Toru (JP-63-222504) Antenna. dated of publication of application Sep. 16, 1998.*

(Continued)

*Primary Examiner*—Sonny Trinh
*Assistant Examiner*—Khai Nguyen
(74) *Attorney, Agent, or Firm*—Scully, Scott, Murphy & Presser

(57) ABSTRACT

The present invention provides a wireless device including: at least an antenna; and at least a conductive ground serving as a ground, through which a high frequency current flows, and the conductive ground having at least a side which is approximately one quarter wavelength of a radio wave transmitted from the antenna, the at least side of the conductive ground having a feeding point, at which the antenna is electrically connected to the conductive ground, wherein the feeding point on the side is positioned closer to one end of the side than a center position, so that the feeding point is positioned asymmetrical to the conductive ground in any directions included in a plane parallel to the conductive ground, whereby the high frequency current flowing, through the conductive ground has an asymmetrical distribution of current over the conductive ground.

30 Claims, 8 Drawing Sheets

U.S. PATENT DOCUMENTS

| | | | | |
|---|---|---|---|---|
| 6,771,223 B1 * | 8/2004 | Shoji et al. | ................. | 343/702 |

FOREIGN PATENT DOCUMENTS

| | | |
|---|---|---|
| GB | 2 255 460 A | 11/1992 |
| GB | 2 345 209 | 6/2000 |
| WO | WO 99/22420 | 5/1999 |
| WO | WO 01/26181 A1 | 4/2001 |
| WO | WO 02/29988 A1 | 4/2002 |

OTHER PUBLICATIONS

Abstract of PCT International Publication No. WO 99/22420, dated May 6, 1999.

Chinese Office Action dated Dec. 5, 2003.

Chinese Office Action dated Apr. 2, 2004 with English language translation.

* cited by examiner

WIRELESS COMMUNICATION DEVICE WITH AN IMPROVED ANTENNA STRUCTURE

BACKGROUND OF THE INVENTION

1. Field of the Invention

The present invention relates to a wireless communication device with an improved antenna structure, and more particularly to a wireless communication device with an improved antenna structure suitable for a high radiation efficiency.

2. Description of the Related Art

The wireless device of mobile type has an antenna for radiating and receiving radio-waves. FIG. 1 is a schematic perspective view of a mobile telephone with a whip antenna. A mobile telephone 1 has a whip antenna 3 which may be extendable and retractable. In place of the whip antenna 3, a helical antenna fixed to a case of the mobile telephone 1 may alternatively be provided. Further, the antenna may be integrated into the case of the mobile telephone 1.

The mobile wireless device has a ground which comprises an electrically conductive plate, wherein a power is supplied into between the ground and the antenna, whereby an electric image is generated. on the ground in symmetrical to an electric image on the antenna 3. The antenna may comprise a dipole antenna which has a length approximately equal to one quarter of the transmitting radio wave. A shield in the case of the mobile wireless device, a shield covering circuitries or circuit parts, and a ground pattern of a printed board may act as the ground. A high frequency current flows on a surface of the conductor as the ground. Performances of the antenna may be an input impedance and a radiation efficiency. The performances of the antenna depend on the current flowing on the ground plate.

The mobile telephone device may perform a transmission operation at a high frequency in the vicinity of 1 HGz. A wavelength of the radio wave is approximately 30 cm, and a quarter-wavelength of the radio wave is thus approximately 7.5 cm. The mobile telephone device is scaled down so that a width is, for example, about 4 cm which is narrower than the quarter-wavelength.

Recently developed mobile telephone devices may perform transmission operations at a higher frequency near 2 GHz, wherein the wavelength of the radio wave is approximately 15 cm, and the quarter-wavelength of the radio wave is thus, slightly shorter than 4 cm. The width of the case of the mobile telephone is about 4 cm which is approximately equal to the quarter-wavelength of the radio wave.

As described above, the high frequency current flowing through the case of the mobile telephone generates the electric image on the case of the mobile telephone. FIG. 2 is a schematic view illustrative of a model of the applied high frequency current on the ground plate of the conventional mobile telephone. The antenna 3 is provided at a feeding point which is positioned at a center point on a top side of the ground plate 2. A first current 5*a* and a second current 5*b* from the feeding point on the one side including the feeding point 4 have the same phase and opposite directions, wherein fields generated. by the first and second currents 5*a* and 5*b* are canceled with each other, whereby effective high frequency currents, which generate the electric image, do not appear in a macroscopic view. As a result, the electric image to the antenna 3 is not generated. on the ground plate 2. This means that the provision of the antenna element 3 in the vicinity of the center position on one side of the ground plate 2 makes the radiation efficiency deteriorated.

In the above circumstances, the development of a novel wireless device with an improved antenna free from the above problems is desirable.

SUMMARY OF THE INVENTION

Accordingly, it is an object of the present invention to provide a novel wireless device with an improved antenna free from the above problems.

It is a further object of the present invention to provide a novel wireless device with an improved antenna at a suitable position for avoiding cancellation of high frequency currents on the surface of the ground plate.

It is a still further object of the present invention to provide a novel wireless device with an improved antenna at a suitable position for improving a radiation efficiency at a high frequency band.

It is yet a further object of the present invention to provide a novel antenna provided on a wireless device free from the above problems.

It is a further object of the present invention to provide a novel antenna provided on a wireless device at a suitable position for avoiding cancellation of high frequency currents on the surface of the ground plate.

It is a still further object of the present invention to provide a novel antenna provided on a wireless device at a suitable position for improving a radiation efficiency at a high frequency band.

The present invention provides a wireless device including at least an antenna; and at least a conductive ground serving as a ground, through which a high frequency current flows, and the conductive ground having at least a side which is approximately one quarter wavelength of a radio wave transmitted from the antenna, the at least side of the conductive ground having a feeding point, at which the antenna is electrically connected to the conductive ground, wherein the feeding point on the side is positioned closer to one end of the side than a center position, so that the feeding point is positioned asymmetrical to the conductive ground in any directions included in a plane parallel to the conductive ground, whereby the high frequency current flowing through the conductive ground has an asymmetrical distribution of current over the conductive ground.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Figure 1:
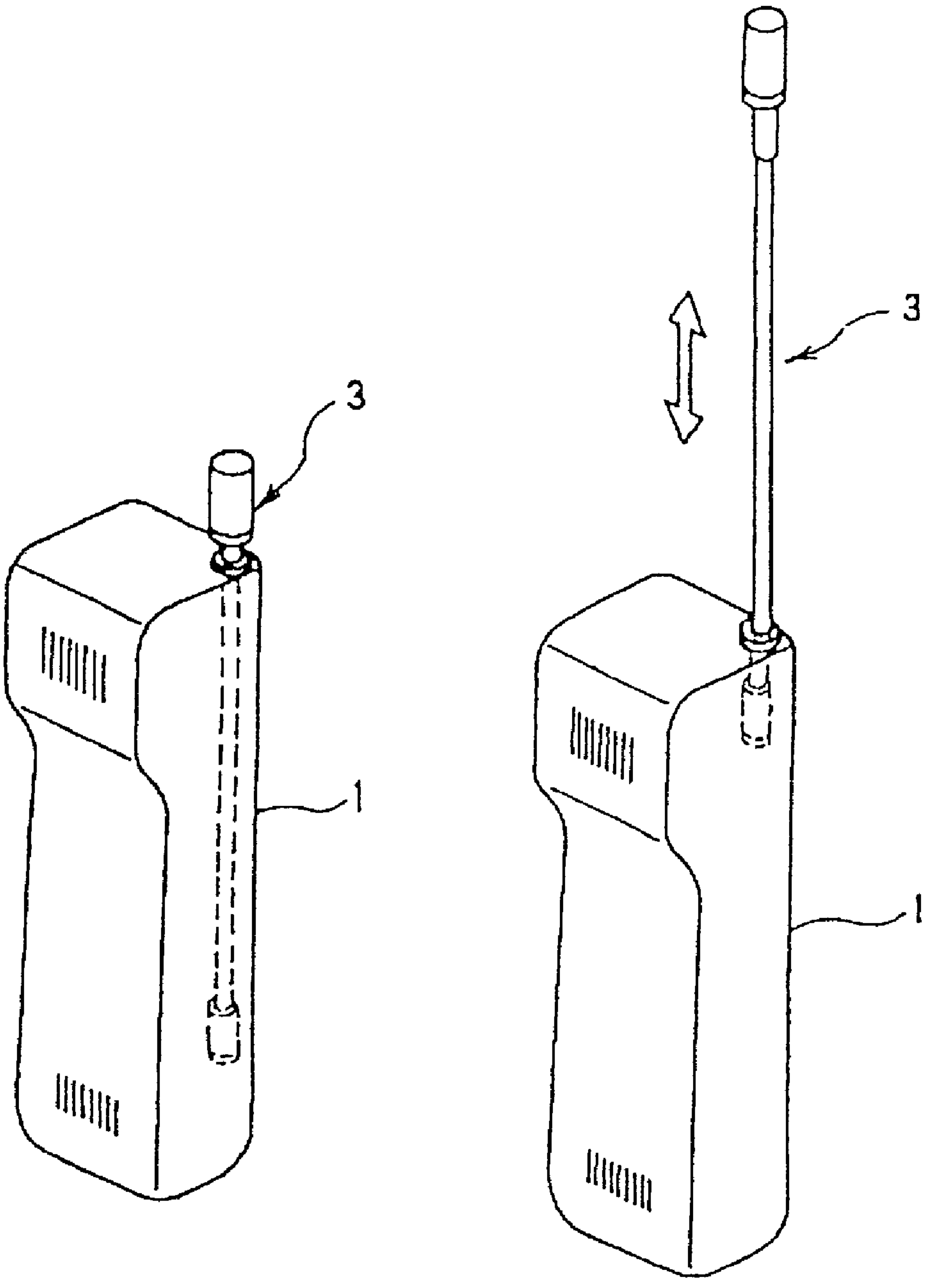
FIG. 1 prior art
FIG. 1 is a schematic perspective view of a mobile telephone with a whip antenna.
Figure 2:
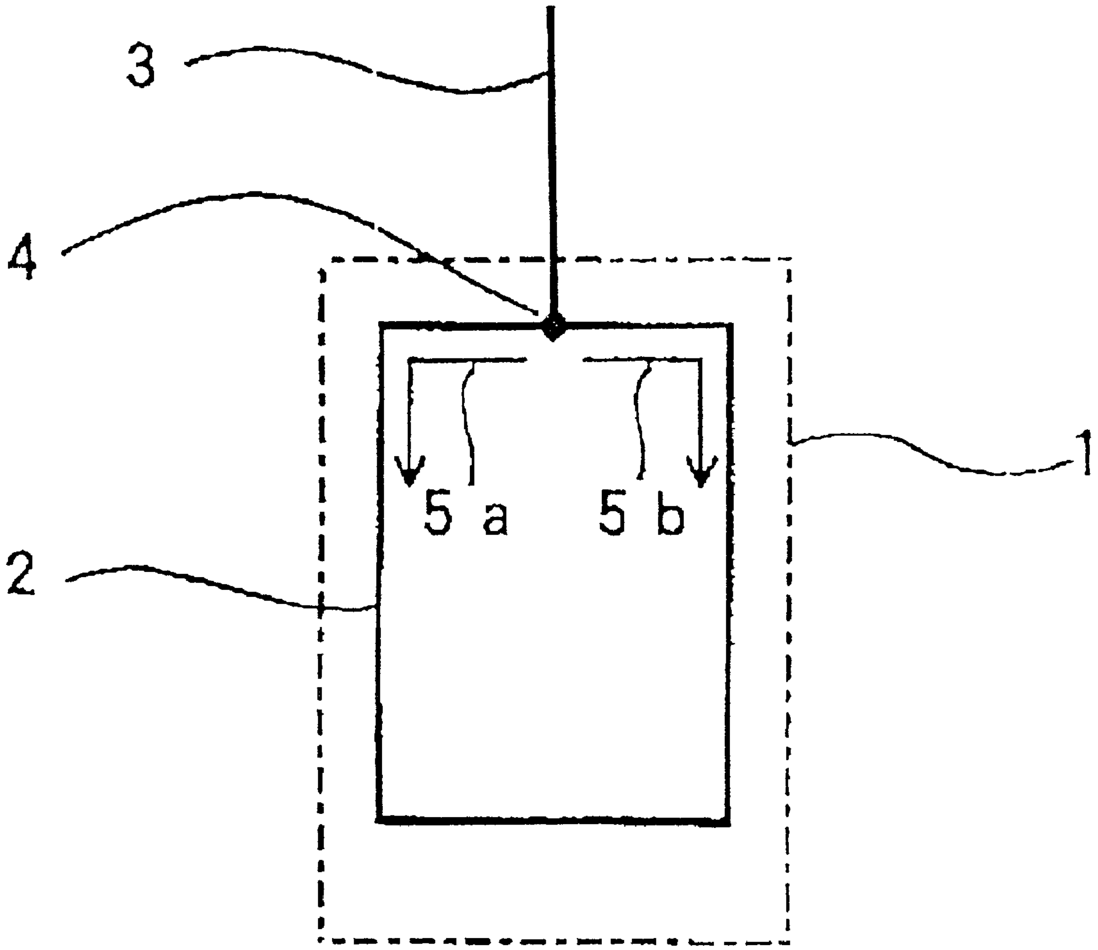
FIG. 2 prior art
FIG. 2 is a schematic view illustrative of a current path of the applied high frequency current on the ground plate of the conventional mobile telephone.

A first aspect of the present invention is a wireless device including: at least an antenna; and at least a conductive ground serving as a ground, through which a high frequency current flows, and the conductive ground having at least a side which is approximately one quarter wavelength of a radio wave transmitted from the antenna, the at least side of the conductive ground having a feeding point, at which the antenna is electrically connected to the conductive ground, wherein the feeding point is positioned asymmetrical to the conductive ground in any directions included in a plane parallel to the conductive ground.

It is possible that the feeding point on the wide is positioned closer to one end of the side than a center position.

It is possible that the high frequency current flowing through the conductive ground has an asymmetrical distribution of current over the conductive ground.

It is possible that the antenna extends in straight from the feeding point in a direction perpendicular to the side and included in the plane which includes the conductive ground.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part extends in straight from the bending portion in a direction parallel to the side and included in the plane which includes the conductive ground.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part extends from the bending portion in generally U-shape which is included in a plane both vertical to the plane which includes the conductive ground and also parallel to the side.

It is possible that the antenna comprises a minority part and a majority part bounded by a bending, portion from the minority part, and the minority part extends in straight from the feeding point to the bending portion in a direction perpendicular to the side and included in the plane which includes the conductive ground, and the majority part extends from the bending portion in open-loop shape which is included in a plane both vertical to the plane which includes the conductive ground and parallel to the side.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part comprises a plate extending from the bending portion in a plane both vertical to the plane which includes the conductive ground and also parallel to the side.

It is possible that the antenna is positioned in a bottom side of the wireless device.

It is possible that the antenna comprises a conductive pattern which is integrated with the conductive ground on a circuit board accommodated in a case of the wireless device.

It is possible that the antenna comprises a conductive plate provided on an inner wail of a case of the wireless device.

It is possible that the conductive ground comprises a conductive pattern on a circuit board accommodated in a case of the wireless device. The antenna may be accommodated in a case of the wireless device. The antenna may be accommodated in a bottom space defined between a bottom of the circuit board and a bottom wall of the case. A frequency of the radio wave may be not lower than 1 GHz. The wireless device may be a mobile telephone device.

A second aspect of the present invention is a wireless device including: at least an antenna; and at least a conductive ground serving as a ground, through which a high frequency current flows, and the conductive ground having at least a side which is approximately one quarter wavelength of a radio wave transmitted from the antenna, the at least side of the conductive ground having a feeding point, at which the antenna is electrically connected to the conductive ground, wherein the feeding point on the side is positioned closer to one end of the side than a center position, so that the feeding point is positioned asymmetrical to the conductive ground in any directions included in a plane parallel to the conductive ground, whereby the high frequency current flowing through the conductive ground has an asymmetrical distribution of current over the conductive ground.

It is possible that the antenna extends in straight from the feeding point in a direction perpendicular to the side and included in the plane which includes the conductive ground.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part extends in straight from the bending portion in a direction parallel to the side and included in the plane which includes the conductive ground.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part extends from the bending portion in generally U-shape which is included in a plane both vertical to the plane which includes the conductive ground and also parallel to the side.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part extends from the bending portion in open-loop shape which is included in a plane both vertical to the plane which includes the conductive ground and parallel to the side.

It is possible that the antenna comprises a minority part and a majority part bounded by a bending portion from the minority part, and the minority part extends in straight from the feeding point to the bending portion in a direction perpendicular to the side and included in the plane which includes the conductive ground, and the majority part comprises a plate extending from the bending portion in a plane both vertical to the plane which includes the conductive ground and also parallel to the side.

It is possible that the antenna is positioned in a bottom side of the wireless device.

It is possible that the antenna comprises a conductive pattern which is integrated with the conductive ground on a circuit board accommodated in a case of the wireless device.

It is possible that the antenna comprises a conductive plate provided on an inner wall of a case of the wireless device.

It is possible that the conductive ground comprises a conductive pattern on a circuit board accommodated in a case of the wireless device. The antenna may be accommodated in a case of the wireless device. The antenna may be accommodated in a bottom space defined between a bottom of the circuit board and a bottom wall of the case. A frequency of the radio wave may be not lower than 1 GHz. The wireless device may be a mobile telephone device.

First Embodiment

Figure 3:
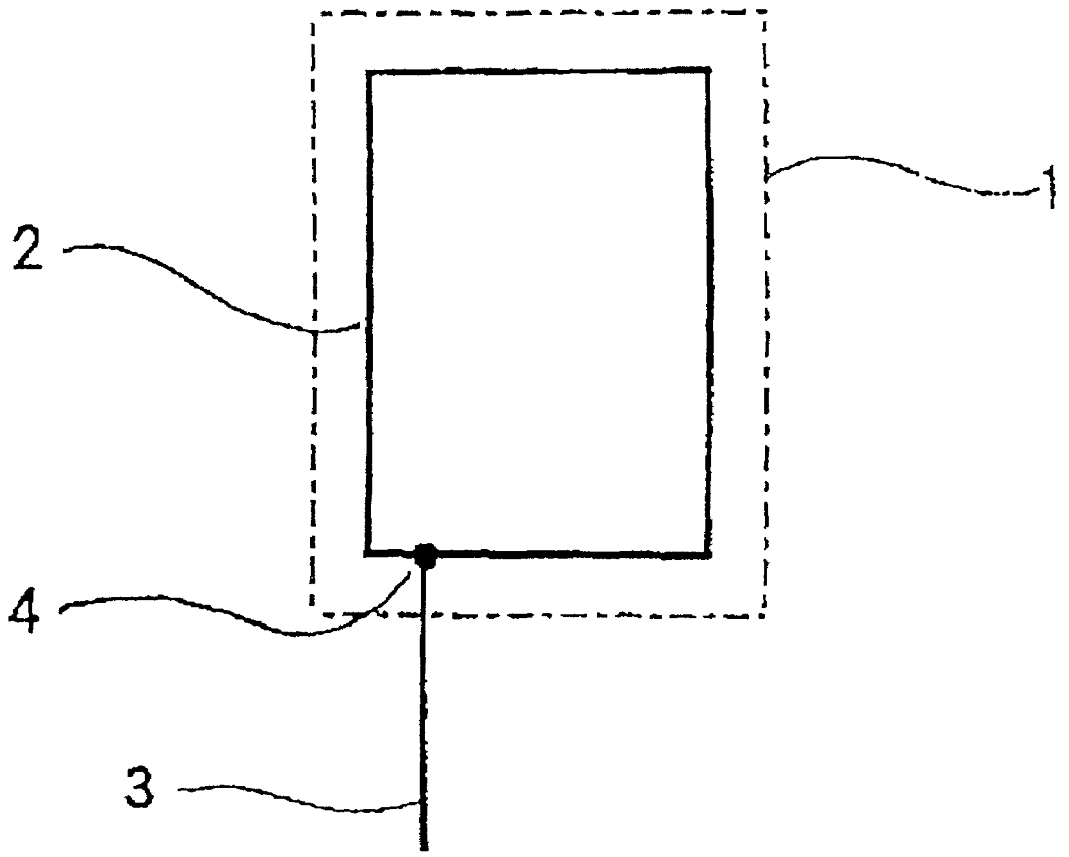
FIG. 3 is a schematic view illustrative of an internal structure of a novel wire-less mobile telephone in a first embodiment in accordance with the present invention.
Figure 4:
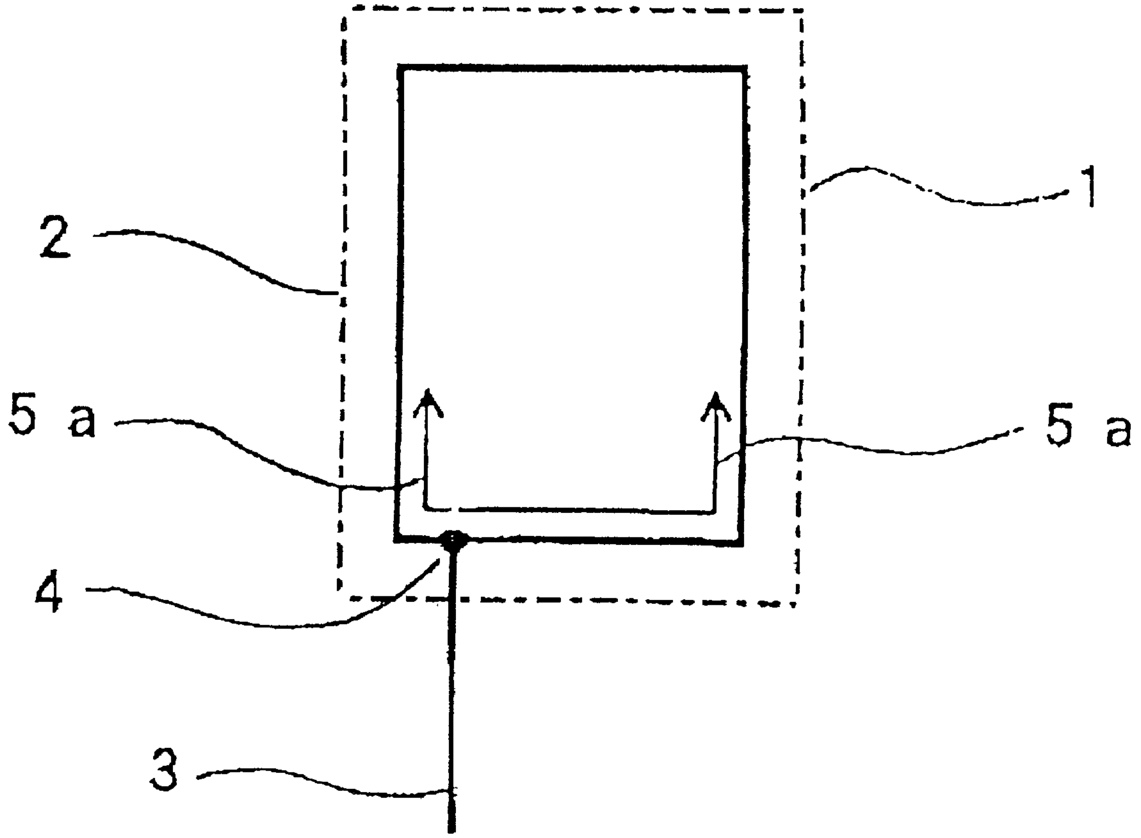
FIG. 4 is a schematic view illustrative of a current path of the applied high frequency current on the ground plate of the novel wire-less mobile telephone of FIG. 3.

A first embodiment according to the present invention will be described in detail with reference to the drawings. FIG. 3 is a schematic view illustrative of an internal structure of a novel wire-less mobile telephone in a first embodiment in accordance with the present invention. FIG. 4 is a schematic view illustrative of a current path of the applied high frequency current on the ground plate of the novel wire-less mobile telephone of FIG. 3.

A wire-less mobile telephone has a case 1, which accommodates a circuit board, a feeding point 4 on a bottom side of the board, and an antenna 3 extending from the feeding point 4 downwardly in straight. The feeding point 4 is positioned closer to one end of the bottom side than a center position of the bottom side. The board has a ground pattern 2 having a ground potential. An electric image symmetrical with reference to the antenna 3 is formed on the ground pattern 2.

A high frequency current flows on the ground pattern 2 as the surface of the board. First and second high frequency currents 5*a* and 5*b* separated at the feeding point 4 flow at the same phase and opposite directions to each other on the bottom side of the ground pattern 2. A first current path for the first high frequency current 5*a* on the bottom side of the ground pattern 2 is much shorter than a second current path for the second high frequency current 5*b* on the bottom side of the ground pattern 2. The field generated. by the first high frequency current 5*a* on the first current path of the bottom side of the ground pattern 2 is canceled with a minority part of the second high frequency current 5*b* on the second current path of the bottom side of the ground pattern 2. The remaining majority part of the second high frequency current 5*b* on the second current path of the bottom side of the ground pattern 2 is, however, not cancelled.

In addition to the ground pattern 2 of the board, a shield of the case 1 and a shield for covering the circuitries or circuit parts on the circuit board also serve as ground. The most outer one of the ground pattern and the shields mainly serves as the conductive ground, on which the electric image to the antenna 3 is generated. The antenna 3 extends from the feeding point 4 which is asymmetrical to the conductive ground in any directions, for example, both horizontal and vertical directions for avoiding cancellation of a majority of the high frequency currents on the conductive ground. Namely, the conductive ground has an asymmetrical distribution of the high frequency currents with reference to the antenna 3 for avoiding cancellation of a majority of the high frequency currents on the conductive ground, thereby allowing generation of an electric image on the conductive ground to the antenna 3, resulting in an improvement in the radiation efficiency of the antenna.

The antenna 3 projecting downwardly does not disturb telephone user in telephone conversions.

Second Embodiment

Figure 5:
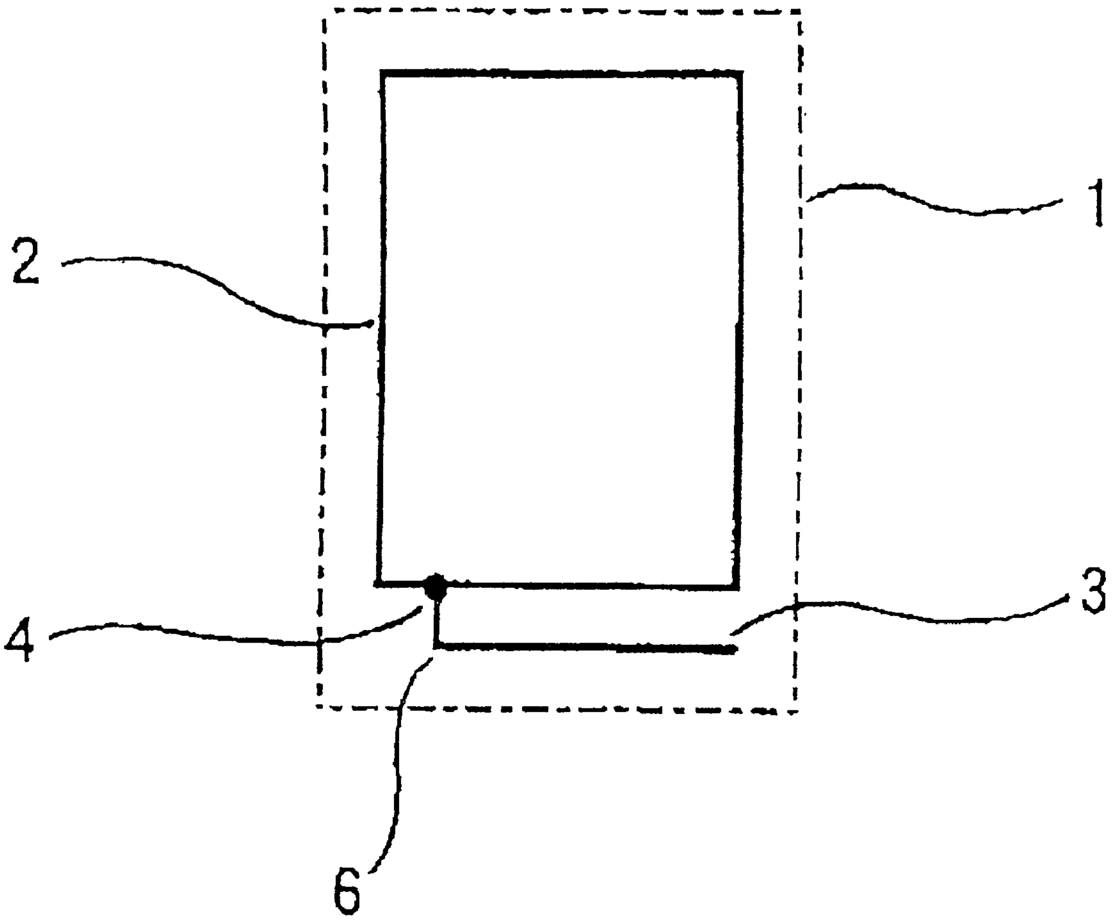
FIG. 5 is a schematic view illustrative of an internal structure of a novel wire-less mobile telephone in a second embodiment in accordance with the present invention.

A second embodiment according to the present invention will be described in detail with reference to the drawing. FIG. 5 is a schematic view illustrative of an internal structure of a novel wire-less mobile telephone in a second embodiment in accordance with the present invention.

A wire-less mobile telephone has a case 1, which accommodates a circuit board and an antenna 6, a feeding point 4 on a bottom side of the board. The antenna 3 has a bending point 6. The antenna 3 is included in a plane which includes the ground pattern 2 of the circuit board. The antenna 3 comprises a minority part extending from the feeding point 4 downwardly up to the bending point 6 and a majority part extending from the bending point 6 horizontally, so that the majority part of the antenna 3 extends horizontally in straight and in parallel to the bottom side of the ground pattern 2, provided that the majority of the antenna 3 is spaced from the bottom side of the ground pattern 2 at a distance defined by a short length of the minority part. The feeding point 4 is positioned closer to a first end of the bottom side than a center position of the bottom side. The majority of the antenna 3 extends horizontally in straight toward a second end opposite to the first end of the bottom side of the ground pattern 2. An electric image symmetrical with reference to the antenna 3 is formed on the ground pattern 2.

A high frequency current flows on the ground pattern 2 as the surface of the board. First and second high frequency currents 5*a* and 5*b* separated at the feeding point 4 flow at the same phase and opposite directions to each other on the bottom side of the ground pattern 2. A first current path for the first high frequency current 5*a* on the bottom side of the ground pattern 2 is much shorter than a second current path for the second high frequency current 5*b* on the bottom side of the ground pattern 2. The field generated. by the first high frequency current 5*a* on the first current path of the bottom side of the ground pattern 2 is canceled with a minority part of the second high frequency current 5*b* on the second current path of the bottom side of the ground pattern 2. The remaining majority part of the second high frequency current 5*b* on the second current path of the bottom side of the ground pattern 2 is, however, not cancelled.

In addition to the ground pattern 2 of the board, a shield of the case 1 and a shield for covering the circuitries or circuit parts on the circuit board also serve as ground. The most outer one of the ground pattern and the shields mainly serves as the conductive ground, on which the electric image to the antenna 3 is generated. The antenna 3 extends from the feeding point 4 which is asymmetrical to the conductive, ground in any directions, for example, both horizontal and vertical directions for avoiding cancellation of a majority of the high frequency currents on the conductive ground. Namely, the conductive ground has an asymmetrical distribution of the high frequency currents with reference to the antenna 3 for avoiding cancellation of a majority of the high frequency currents on the, conductive ground, thereby allowing generation of an electric image on the conductive ground to the antenna 3, resulting in an improvement in the radiation efficiency of the antenna.

The antenna 3 does not project from the case 1 and also does extend in the plane including the ground pattern 2, so that a further size reduction of the mobile wireless telephone device can be obtained.

As a modification to the second embodiment, it is also possible that the antenna 3 may comprise a conductive pattern which is provided on the circuit board together with the ground pattern 2. Namely, the conductive pattern serving as the antenna 3 and the ground pattern 2 serving as the conductive ground are integrated on the single circuit board accommodated in the case 1. This modified arrangement of the antenna may allow a further reduction in size of the mobile wireless telephone device. The antenna is not a separate, part from the circuit board for a reduction in the number of the necessary part of the mobile wireless telephone device.

Third Embodiment

Figure 6:
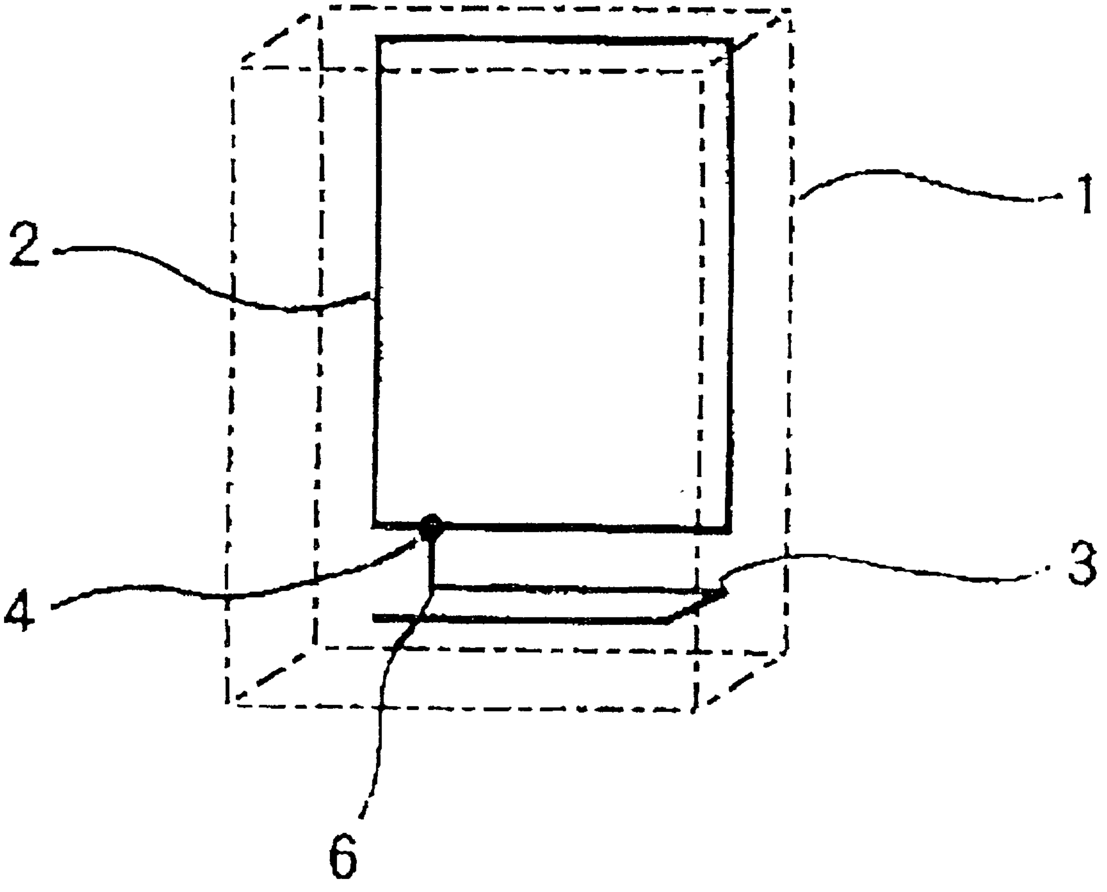
FIG. 6 is a schematic view illustrative of an internal structure of a novel wire-less mobile telephone in a third embodiment in accordance with the present invention.

A third embodiment according to the present invention will be described in detail with reference to the drawing. FIG. 6 is a schematic view illustrative of an internal structure of a novel wire-less mobile telephone in a third embodiment in accordance with the present invention.

A wire-less mobile telephone has a case 1, which accommodates a circuit board and an antenna 6, a feeding point 4 on a bottom side of the board. The antenna 3 has a bending point 6. The antenna 3 comprises a minority part extending from the feeding point 4 downwardly up to the bending point 6 and a majority part extending from the bending point 6 horizontally, so that the majority part of the antenna 3 extends horizontally in generally U-shape and in parallel to the bottom side of the ground pattern 2, provided that the majority of the antenna 3 is spaced from the bottom side of the ground pattern 2 at a distance defined by a short length of the minority part. The generally U-shaped majority part of the antenna 3 is included in a plane vertical to the ground pattern 2. The feeding point 4 is positioned closer to a first end of the bottom side than a center position of the bottom side. An electric image symmetrical with reference to the antenna 3 is formed on the ground pattern 2.

A high frequency current flows on the ground pattern 2 as the surface of the board. First and second high frequency currents 5*a* and 5*b* separated at the feeding point 4 flow at the same phase and opposite directions to each other on the bottom side of the ground pattern 2. A first current path for the first high frequency current 5*a* on the bottom side of the ground pattern 2 is much shorter than a second current path for the second high frequency current 5*b* on the bottom side of the ground pattern 2. The field generated. by the first high frequency current 5*a* on the first current path of the bottom side of the ground pattern 2 is canceled with a minority part of the second high frequency current 5*b* on the second current path of the bottom side of the ground pattern 2. The remaining majority part of the second high frequency current 5*b* on the second current path of the bottom side of the ground pattern 2 is, however, not cancelled.

In addition to the ground pattern 2 of the board, a shield of the case 1 and a shield for covering the circuitries or circuit parts on the circuit board also serve as ground. The most outer one of the ground pattern and the shields mainly serves as the conductive ground, on which the electric image to the antenna 3 is generated. The antenna 3 extends from the feeding point 4 which is asymmetrical to the conductive ground in any directions, for example, both horizontal and vertical directions for avoiding cancellation of a majority of the high frequency currents on the conductive ground. Namely, the conductive ground has an asymmetrical distribution of the high frequency currents with reference to the antenna 3 for avoiding cancellation of a majority of the high frequency currents ion the conductive ground, thereby allowing generation of an electric image on the conductive ground to the antenna 3, resulting in an improvement in the radiation efficiency of the antenna.

Even the antenna 3 is longer than the quarter-wavelength of the radio wave and also longer than the width of the case 1 of the mobile wireless telephone device, the antenna 3 does not project from the case 1 and also does extend in the plane including the ground pattern 2, so that a further size reduction of the mobile wireless telephone device can be obtained.

As a modification to the third embodiment, it is also possible that the antenna 3 may comprise a conductive pattern which extends over a first surface of the circuit board together with the ground pattern 2 as well as extends through a through hole of the circuit board and further extends over a second surface of the circuit board. Namely, the conductive pattern serving as the antenna 3 and the ground pattern 2 serving as the conductive ground are integrated on the single circuit board accommodated in the case 1. This modified arrangement of the antenna may allow a further reduction in size of the mobile wireless telephone device. The antenna is not a separate part from the circuit board for a reduction in the number of the necessary parts of the mobile wireless telephone device.

Fourth Embodiment

Figure 7:
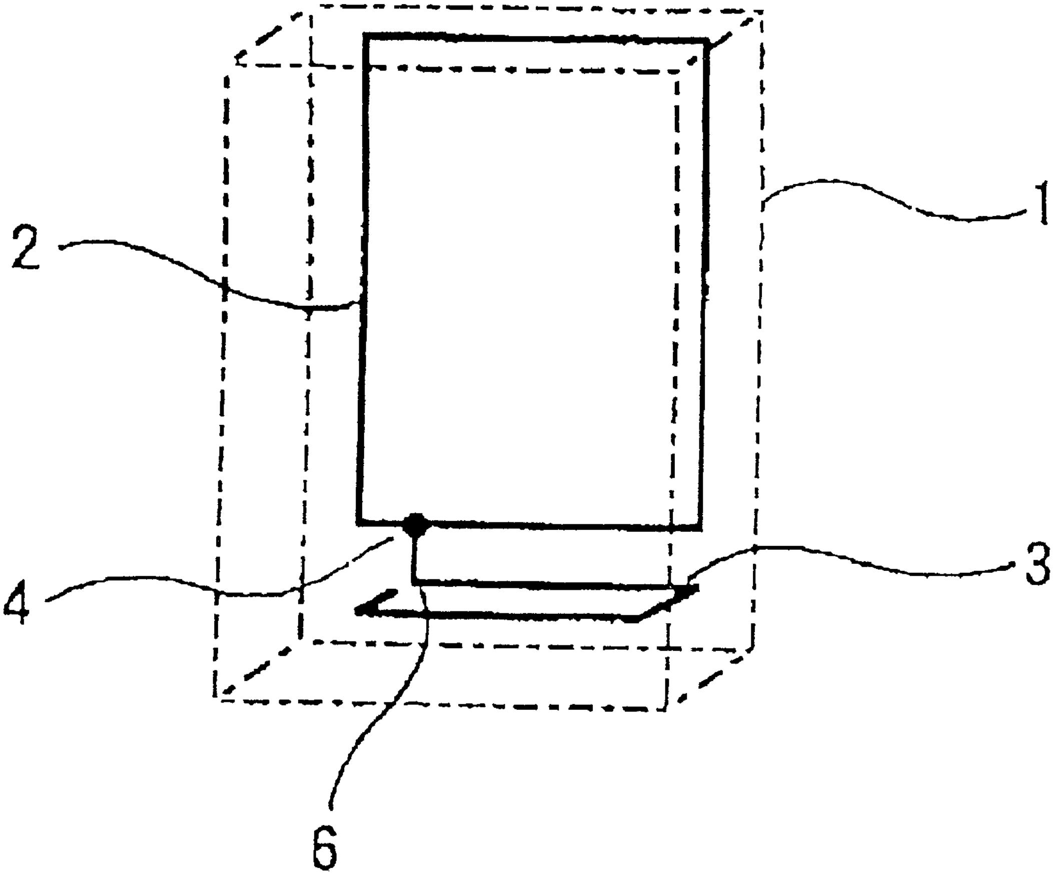
FIG. 7 is a schematic view illustrative of an internal structure of a novel wire-less mobile telephone in a fourth embodiment in accordance with the present invention.

A fourth embodiment according to the present invention will be described in detail with reference to the drawing. FIG. 7 is a schematic view illustrative of an internal structure of a novel wire-less mobile telephone in a fourth embodiment in accordance with the present invention.

A wire-less mobile telephone has a case 1 which accommodates a circuit board and an antenna 6, a feeding point 4 on a bottom side of the board. The antenna 3 has a bending point 6. The antenna 3 comprises a minority part extending from the feeding point 4 downwardly up to the bending point 6 and a majority part extending from the bonding point 6 horizontally, so that the majority part of the antenna 3 extends horizontally in generally open-loop shape and in parallel to the bottom side of the ground pattern 2, provided that the majority of the antenna 3 is spaced from the bottom side of the ground pattern 2 at a distance defined by a short length of the minority part. The generally open-loop shaped majority part of the antenna 3 is included in a plane vertical to the ground pattern 2. The feeding point 4 is positioned closer to a first end of the bottom side than a center position of the bottom side. An electric image symmetrical with reference to the antenna 3 is formed on the ground pattern 2.

A high frequency current flows on the ground pattern 2 as the surface of the board. First and second high frequency currents 5*a* and 5*b* separated at the feeding point 4 flow at the same phase and opposite directions to each other on the bottom side of the ground pattern 2. A first current path for the first high frequency current 5*a* on the bottom side of the ground pattern 2 is much shorter than a second current path for the second high frequency current 5*b* on the bottom side of the ground pattern 2. The field generated. by the first high frequency current 5*a* on the first current path of the bottom side of the ground pattern 2 is canceled with a minority part of the second high frequency current 5*b* on the second current path of the bottom side of the ground pattern 2. The remaining majority part of the second high frequency current **5*b* on the second current path of the bottom side of the ground pattern 2** is, however, not cancelled.

In addition to the ground pattern 2 of the board, a shield of the case 1 and a shield for covering the circuitries or circuit parts on the circuit board also serve as ground. The most outer one of the ground pattern and the shields mainly serves as the conductive ground, on which the electric image to the antenna 3 is generated. The antenna 3 extends from the feeding point 4 which is asymmetrical to the conductive ground in any directions, for example, both horizontal and vertical directions for avoiding cancellation of a majority of the high frequency currents on the conductive ground. Namely, the conductive ground has an asymmetrical distribution of the high frequency currents with reference to the antenna 3 for avoiding cancellation of a majority of the high frequency currents on the conductive ground, thereby allowing generation of an electric image on the conductive ground to the antenna 3, resulting in an improvement in the radiation efficiency of the antenna.

Even the antenna 3 is longer than the quarter-wavelength of the radio wave and also longer than the width of the case 1 of the mobile wireless telephone device, the antenna 3 does not project from the case 1 and also does extend in the plane including the ground pattern 2, so that a further size reduction of the mobile wireless telephone device can be obtained.

As a modification to the fourth embodiment, it is also possible that the antenna 3 may comprise a conductive pattern which extends over a first surface of the circuit board together with the ground pattern 2 as well as extends through a first through hole of the circuit board and further extends over a second surface of the circuit board and further extends a second through hole of the circuit board. Namely, the conductive pattern serving as the antenna 3 and the ground pattern 2 serving as the conductive ground are integrated on the single circuit board accommodated in the case 1. This modified arrangement of the antenna may allow a further reduction in size of the mobile wireless telephone device. The antenna is not a separate part from the circuit board for a reduction in the number of the necessary parts of the mobile wireless telephone device.

Fifth Embodiment

Figure 8:
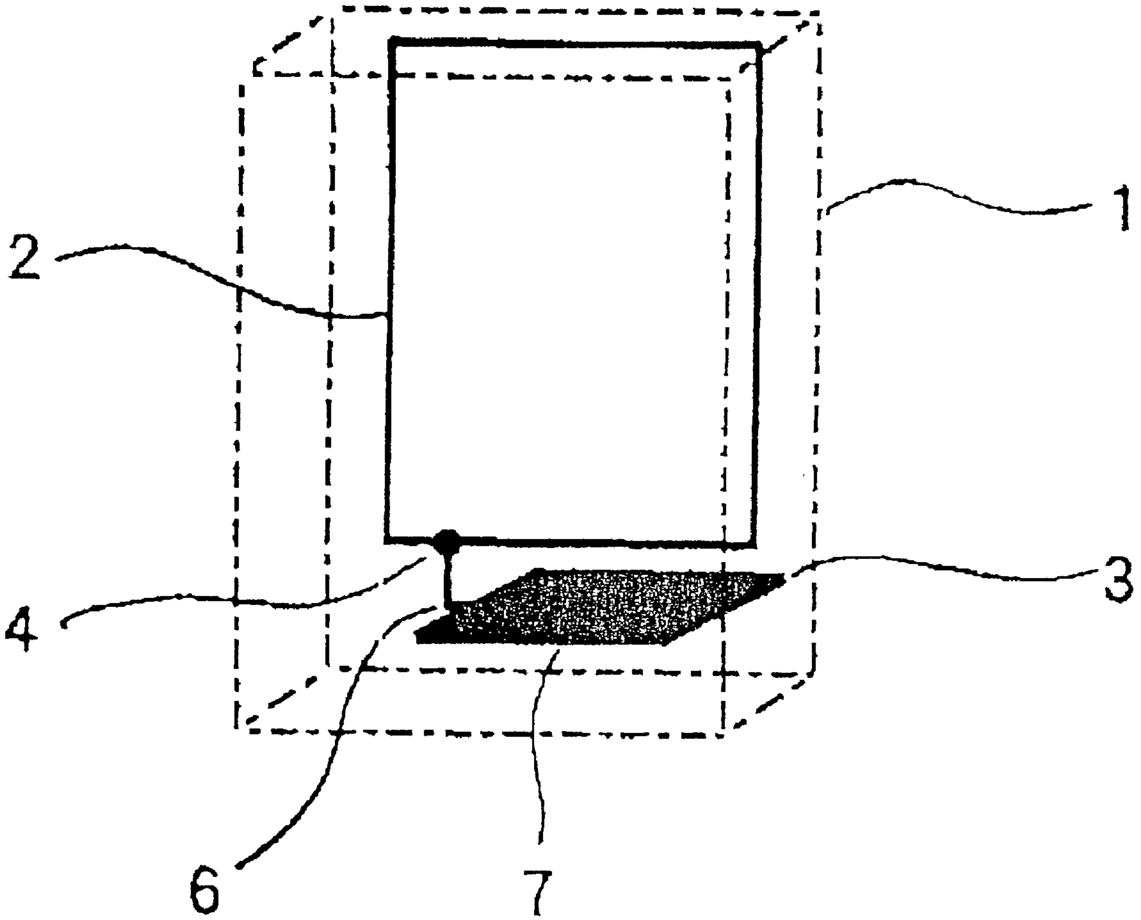
FIG. 8 is a schematic view illustrative of an internal structure of a novel wire-less mobile telephone in a fifth embodiment in accordance with the present invention.

A fifth embodiment according to the present invention will be described in detail with reference to the drawing. FIG. 8 is a schematic view illustrative of an internal structure of a novel wire-less mobile telephone in a fifth embodiment in accordance with the present invention.

A wire-less mobile telephone has a case 1, which accommodates a circuit board and an antenna 6, a feeding point 4 on a bottom side of the board. The antenna 3 has a bending point 6. The antenna 3 comprises a minority part extending from the feeding point 4 downwardly up to the bending point 6 and a majority part extending from the bending point 6 horizontally, so that the majority part of the antenna 3 comprises an expanded part which extends horizontally in generally rectangle plane and in parallel to the bottom side of the ground pattern 2, provided that the majority of the antenna 3 is spaced from the bottom side of the ground pattern 2 at a distance defined by a short length of the minority part. The feeding point 4 is positioned closer to a first end of the bottom side than a center position of the bottom side. An electric image symmetrical with reference to the antenna 3 is formed on the ground pattern 2.

A high frequency current flows on the ground pattern 2 as the surface of the board. First and second high frequency currents **5*a* and 5*b* separated at the feeding point 4 flow at the same phase and opposite directions to each other on the bottom side of the ground pattern 2. A first current path for the first high frequency current 5*a* on the bottom side of the ground-pattern 2 is much shorter than a second current path for the second high frequency current 5*b* on the bottom side of the ground pattern 2. The field generated. by the first high frequency current 5*a* on the first current path of the bottom side of the ground pattern 2 is canceled with a minority part of the second high frequency current 5*b* on the second current path of the bottom side of the ground pattern 2. The remaining majority part of the second high frequency current 5*b* on the second current path of the bottom side of the ground pattern 2** is, however, not cancelled.

In addition to the ground pattern 2 of the board, a shield of the case 1 and a shield for covering the circuitries or circuit parts on the circuit board also serve as ground. The most outer one of the ground pattern and the shields mainly serves as the conductive ground, on which the electric image to the antenna 3 is generated. The antenna 3 extends from the feeding point 4 which is asymmetrical to the conductive ground in any directions, for example, both horizontal and vertical directions for avoiding cancellation of a majority of the high frequency currents on the conductive ground. Namely, the conductive ground has an asymmetrical distribution of the high frequency currents with reference to the antenna 3 for avoiding cancellation of a majority of the high frequency currents on the conductive ground, thereby allowing generation of an electric image on the conductive ground to the antenna 3, resulting in an improvement in the radiation efficiency of the antenna.

Even the antenna 3 is longer than the quarter-wavelength of the radio wave and also longer than the width of the case 1 of the mobile wireless telephone device, the antenna 3 does not project from the case 1 and also does extend in the plane vertical to the ground pattern 2, so that a further size reduction of the mobile wireless telephone device can be obtained.

The expanded majority part of the antenna 3 increases a wide band of the available frequency and improves a voltage standing wave ratio (VSWR).

As a modification to the fifth embodiment, it is also possible that the antenna 3 may comprise a conductive pattern which extends over the bottom face of the case 1. Alternatively, the antenna 3 may comprise another conductive pattern which extends over the circuit board together with the ground pattern 2. Namely, the conductive pattern serving as the antenna 3 and the ground pattern 2 serving as the conductive ground are integrated on the single circuit board accommodated in the case 1. This modified arrangement of the antenna may allow a further reduction in size of the mobile wireless telephone device. The antenna is not a separate part from the circuit board for a reduction in the number of the necessary parts of the mobile wireless telephone device.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A wireless device including:

at least an antenna; and at least a conductive ground serving as a ground, through which a high frequency current flows, and said conductive ground having at least a side which is approximately one quarter wavelength of a radio wave transmitted from said antenna, said at least side of said conductive ground having a feeding point, at which said antenna is electrically connected to said conductive ground, wherein said feeding point is positioned asymmetrical to said conductive ground in any directions included in a plane parallel to said conductive ground.

2. The wireless device as claimed in claim 1, wherein said feeding point on said side is positioned closer to one end of said side than a center position.

3. The wireless device as claimed in claim 1, wherein said high frequency current flowing through said conductive ground has an asymmetrical distribution of current over said conductive ground.

4. The wireless device as claimed in claim 1, wherein said antenna extends in straight from said feeding point in a direction perpendicular to said side and included in said plane which includes said conductive ground.

5. The wireless device as claimed in claim 1, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends in straight from said bending portion in a direction parallel to said side and included in said plane which includes said conductive ground.

6. The wireless device as claimed in claim 1, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends from said bending portion in generally U-shape which is included in a plane both vertical to said plane which includes said conductive ground and also parallel to said side.

7. The wireless device as claimed in claim 1, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends from said bending portion in open-loop shape which is included in a plane both vertical to said plane which includes said conductive ground and parallel to said side.

8. The wireless device as claimed in claim 1, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part comprises a plate extending from said bending portion in a plane both vertical to said plane which includes said conductive ground and also parallel to said side.

9. The wireless device as claimed in claim 1, wherein said antenna is positioned in a bottom side of said wireless device.

10. The wireless device as claimed in claim 1, wherein said antenna comprises a conductive pattern which is integrated with said conductive ground on a circuit board accommodated in a case of said wireless device.

11. The wireless device as claimed in claim 1, wherein said antenna comprises a conductive plate provided on an inner wall of a case of said wireless device.

12. The wireless device as claimed in claim 1, wherein said conductive ground comprises a conductive pattern on a circuit board accommodated in a case of said wireless device.

13. The wireless device as claimed in claim 12, wherein said antenna is accommodated in a case of said wireless device.

14. The wireless device as claimed in claim 13, wherein said in antenna is accommodated in a bottom space defined between a bottom of said circuit board and a bottom wall of said case.

15. The wireless device as claimed in claim 14, wherein a frequency of said radio wave is not lower than 1 GHz.

16. The wireless device as claimed in claim 15, wherein said wireless device is a mobile telephone device.

17. A wireless device including:

at least an antenna; and at least a conductive ground serving as a ground, through which a high frequency current flows, and said conductive ground having at least a side which is approximately one quarter wavelength of a radio wave transmitted from said antenna, said at least side of said conductive ground having a feeding point, at which said antenna is electrically connected to said conductive ground, wherein said feeding point on said side is positioned closer to one end of said side than a center position, so that said feeding point is positioned asymmetrical to said conductive ground in any directions included in a plane parallel to said conductive ground, whereby said high frequency current flowing through said conductive ground has an asymmetrical distribution of current over said conductive ground.

18. The wireless device as claimed in claim 17, wherein said antenna extends in straight from said feeding point in a direction perpendicular to said side and included in said plane which includes said conductive ground.

19. The wireless device as claimed in claim 17, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends in straight from said bending portion in a direction parallel to said side and included in said plane which includes said conductive ground.

20. The wireless device as claimed in claim 17, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends from said bending portion in generally U-shape which is included in a plane both vertical to said plane which includes said conductive ground and also parallel to said side.

21. The wireless device as claimed in claim 17, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part extends from said bending portion in open-loop shape which is included in a plane both vertical to said plane which includes said conductive ground and parallel to said side.

22. The wireless device as claimed in claim 17, wherein said antenna comprises a minority part and a majority part bounded by a bending portion from said minority part, and said minority part extends in straight from said feeding point to said bending portion in a direction perpendicular to said side and included in said plane which includes said conductive ground, and said majority part comprises a plate extending from said bending portion in a plane both vertical to said plane which includes said conductive ground and also parallel to said side.

23. The wireless device as claimed in claim 17, wherein said antenna is positioned in a bottom side of said wireless device.

24. The wireless device as claimed in claim 17, wherein said antenna comprises a conductive pattern which is integrated with said conductive ground on a circuit board accommodated in a case of said wireless device.

25. The wireless device as claimed in claim 17, wherein said antenna comprises a conductive plate provided on an inner wall of a case of said wireless device.

26. The wireless device as claimed in claim 17, wherein said conductive ground comprises a conductive pattern on a circuit board accommodated in a case of said wireless device.

27. The wireless device as claimed in claim 26, wherein said antenna is accommodated in a case of said wireless device.

28. The wireless device as claimed in claim 27, wherein said antenna is accommodated in a bottom space defined between a bottom of said circuit board and a bottom wall of said case.

29. The wireless device as claimed in claim 28, wherein a frequency of said radio wave is not lower than 1 GHz.

30. The wireless device as claimed in claim 29, wherein said wireless device is a mobile telephone device.

* * * * *